Oct. 21, 1958  K. L. PECK  2,856,880
STOWABLE SHIP CARGO FLOOR
Filed June 15, 1956  2 Sheets-Sheet 1

INVENTOR
Kenneth L. Peck
BY
Pennie Edmonds Morton Barrows Taylor
ATTORNEYS

Oct. 21, 1958  K. L. PECK  2,856,880
STOWABLE SHIP CARGO FLOOR
Filed June 15, 1956  2 Sheets-Sheet 2
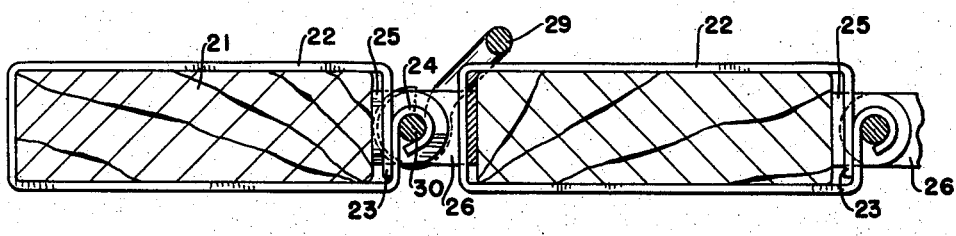
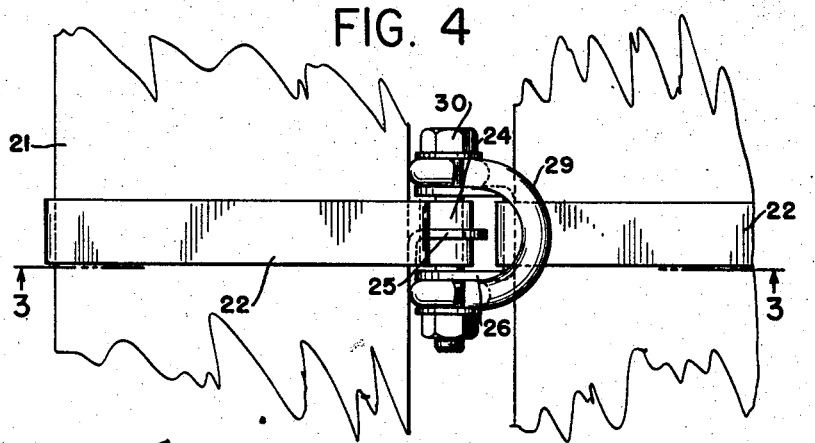
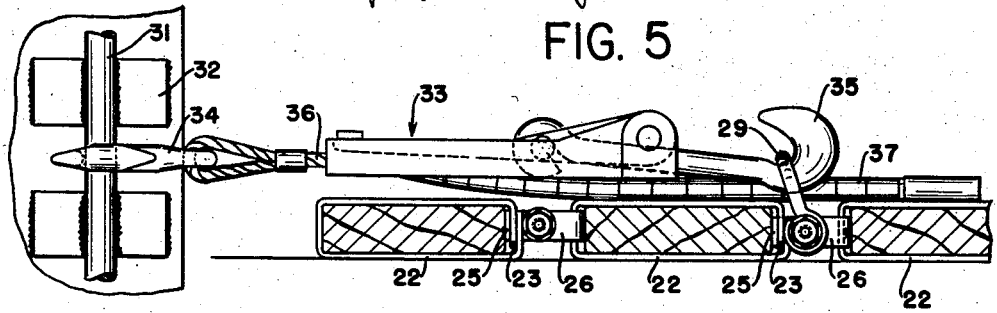
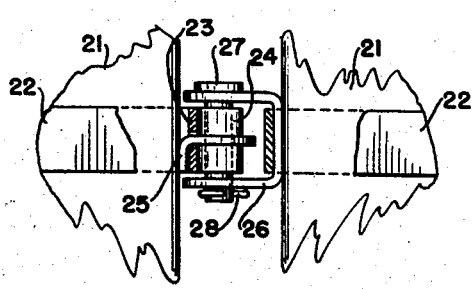
INVENTOR
Kenneth L. Peck
BY
ATTORNEYS

United States Patent Office 2,856,880
Patented Oct. 21, 1958

2,856,880

STOWABLE SHIP CARGO FLOOR

Kenneth L. Peck, Sayville, N. Y., assignor to Peck & Hale, Inc., Sayville, N. Y., a corporation of New York Application June 15, 1956, Serial No. 591,595

6 Claims. (Cl. 114—75)

This invention relates to cargo floors for use in marine vessels, and is more particularly concerned with an improved flooring structure which may be easily laid in place or taken up, and which provides an improved foundation for supporting cargo.

In the loading of the cargo holds of marine vessels, high density cargo is commonly placed at the bottom of the hold and is packed tightly and arranged to form a fairly level upper surface. Dunnage consisting of loose planks is then placed on the top of the cargo to form a floor, upon which other cargo, such as automobiles, for example, can be placed. Usually, two layers of dunnage are laid down with the planks of one layer at right angles to those of the other. Such cargo as vehicles, machinery, boxes, crates, etc., placed on dunnage must be secured against shifting by chocking, bracing, or shoring, and this work is performed by carpenters using pieces of wood nailed to the dunnage. The use of dunnage is disadvantageous, in that there is a continuing danger of cargo shift and the laying of the dunnage and its removal at the end of the voyage are expensive, because of the labor and materials involved. Also, the securing of pieces of cargo thereto as described is an additional expense.

The present invention is directed to the provision of a floor structure for use on shipboard as a replacement for dunnage, the new structure being capable of being rolled up, so that it can be stowed out of the way of loading and unloading operations and quickly laid in place and removed, as required. The new floor is made up of units formed of a plurality of planks connected by hinge assemblies and the units are connected at one end of the sides of the ship. When the floor is in use, the units extend out over the cargo and provide support for additional pieces of cargo, and, when desired, the units may be rolled up and secured against the sides of the ship. Each hinge assembly may be provided with means for attachment of a lashing thereto, so that pieces of cargo placed on the floor may be lashed in place and the use of manually installed chocks, etc., may be avoided.

For a better understanding of the invention, reference should be made to the accompanying drawings, in which:

Fig. 3 is an enlarged fragmentary cross-sectional view of the cargo floor;

Fig. 4 is an enlarged fragmentary top plan view of the cargo floor;

Fig. 5 is an enlarged fragmentary cross-sectional view on the line 5—5 of Fig. 2, showing the manner in which the floor is secured to the side of the ship; and Fig. 6 is a fragmentary plan view with parts removed showing the connection between a pair of hinge assemblies.

Figure 1:
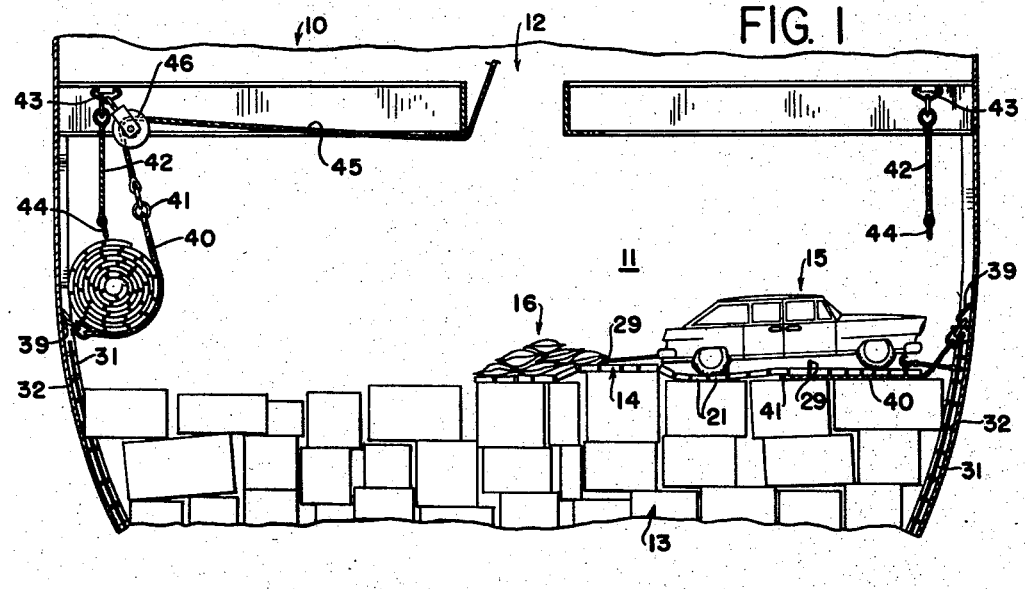
Fig. 1 is a fragmentary cross-sectional view through the hold of a cargo ship, showing the new cargo floor in stowed condition, and also in use.
Figure 2:
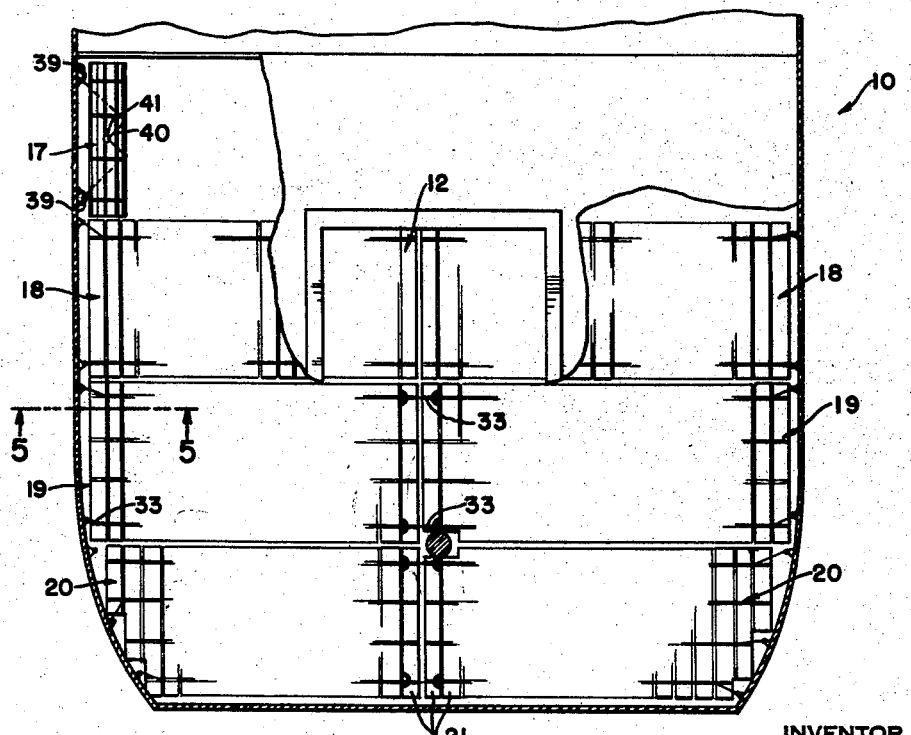
Fig. 2 is a fragmentary top plan view with parts broken away of one deck of a ship with the new floor partly in place and partly stowed.

The cargo vessel 10 is shown as having a hold 11, into which cargo is loaded through a hatch 12. In loading the vessel, high density cargo indicated at 13 is placed on the bottom of the hold, after which the new floor 14 is placed on the top of the dense cargo to form a support for pieces of cargo, such as automobiles 15, sacks of potatoes 16, etc.

The cargo floor of the invention comprises a plurality of flooring units 17, 18, 19, 20, of which there may be any number, depending upon the size and shape of the hold. Each unit is of sufficient length to extend from the side of the ship to the median line of the hold and comprises a plurality of planks 21 lying side by side. The planks are of a length dependent upon the dimensions of the section of the hold, in which the floor unit is to be used, and the planks may conveniently be 6″ in width and 2″ thick.

Each plank in a floor unit is provided with a plurality of hinge assemblies spaced lengthwise of the plank and the assemblies on adjacent planks are connected by hinge pin elements. Each hinge assembly includes a frame strap 22 formed of a strip of metal bent to rectangular form and encircling the plank with its ends overlapping. The inner end 23 of the strap has a closed vertical slot therein, while the outer end is looped to form a sleeve 24 and has a vertical slot extending through the sleeve 24 and lying in registry with the slot in the inner end 23. One leg of an L-shaped tongue 25 is inserted through the slots in the frame strap and the other leg of the tongue 25 lies between the strap 22 and the edge of the plank 21. The tongue 25 has an opening therein aligned with the opening through sleeve 24.

The hinge assemblies of all the planks 21 in a floor unit are aligned and, in order to connect the planks, a U-shaped connector 26 is placed within each frame strap at the end thereof opposite the sleeve 24 and with its legs lying on opposite sides of the strap. The legs of each connector 26 are spaced to receive the sleeve 24 of a frame strap between them and have aligned openings adapted to register with the opening through a sleeve. When a connector 26 is thus in position, a pin 27 may be inserted through the openings through the sleeve and the connector legs and held in place by a cotter pin 28. The connection thus formed between the adjacent assemblies has great strength and lies between the upper and lower surfaces of the planks on either side of it.

At certain hinge connections, shackles 29 are provided for attachment of lashing means for securing cargo to the flooring. The shackles 29 are of ordinary U-shaped form and, in the connections where they are to be used, the pins 27 are replaced by longer bolts 30, which complete the hinge joints and provide the shackle mountings. Any number of shackles may be employed and they are ordinarily distributed uniformly over the flooring units.

The flooring units are connected to the sides of the ship by means of hook-in bars 31 disposed at opposite sides of the hold 11. The bars are secured to the ship structure by spaced sections 32 of angle iron welded in place and extending vertically. The flooring units may be connected to the bars and to each other by any suitable means, such as the adjustable cable 33 described and claimed in my Patent 2,472,026, issued April 13, 1949. The patented cable has hooks 34, 35 at opposite ends with one hook connected to a cable 36 carrying spacers, while the other hook is connected to a yoke and toggle assembly adapted to grip the cable between adjacent spacers and operable to take up slack. The cable is, therefore, adjustable in length, so that the flooring units may be tightly secured together.

When the flooring units are not in use, they may be rolled up and stowed at the sides of the hold. For this purpose, a pair of pad eyes 39 are mounted on the side of the hold opposite the area to be covered by a unit and above the normal level of the unit, when in use. A rolling bridle 40 for the unit is then formed by a pair of cables secured at one end to the pad eyes and at the other end to a ring 41. The bridle 40 extends under and around a rolled-up unit, as shown in Fig. 1, and may be secured in position to hold the unit in place against the side of the vessel by a stowage bridle 42 connected at one end to a pad eye 43 attached to a frame member of the vessel and having at its other end a hook 44 for connecting the bridle 42 to the ring 41 of the rolling bridle 40.

In using the new flooring, the layer of dense cargo 13 is placed in the bottom of the hold in the usual manner to form a relatively level surface. The rolled-up flooring units are then lowered along the sides of the hold, until the rolls rest on the dense cargo. This may be accomplished by employing one of the ship's falls 45 passed over a pulley 46 in a block attached to a pad eye 43. The fall is connected to the ring 41 of the rolling bridle 40 and may be taken up to permit release of the stowage bridle 40 and then let out to lower the rolled unit upon the cargo 13. As soon as the unit rests upon the dense cargo, the fall is disengaged and the unit is unrolled toward the center of the hold. The units are laid out over the cargo from opposite sides of the hold and the ends of the units of each pair are secured to the hook-in bars 31 and to each other by cables 33. As many units of flooring are laid out as is necessary to cover the cargo. If desired, additional layers of dense cargo and additional layers of flooring may be provided and the hook-in bars 31 extend vertically in the hold, so that the flooring units may be secured at various levels.

The uppermost layer of flooring has a plurality of shackles 29 exposed, so that such cargo as automobiles, large crates, etc., may be lashed in place conveniently. For this purpose, lashings provided with the adjustable cable connections of the patent may be used, so that the cargo is held securely in place.

To remove the flooring units, the securing cables 33 are removed and the units are manually rolled toward the sides of the hold. As the roll approaches the side of the hold, the free end of the rolling bridle becomes exposed and it can then be connected to a fall 45 passed through the hatch opening and over a pulley 46. When the fall is taken up, the rolling up of the flooring unit is completed and it can be raised into stowage position, as shown in Fig. 1. The stowage bridle 42 is then engaged with the rolling bridle, and the fall is released and withdrawn through the hatch opening.

The new stowable flooring offers important advantages over the dunnage heretofore used, in that the flooring can be laid in about half the time and can be rolled up and hoisted out of the way in about one-third the time required for similar operations with dunnage. The new flooring gives a smoother, evener working surface for general cargo than that provided by dunnage and affords a better rolling surface for vehicles with resultant faster handling of cargo. In the rolled-up position, the flooring exposes the cargo beneath and does not have to be shifted, as is necessary with dunnage, in order that all the cargo can be removed. The flooring provides fittings for lashing of vehicles and other cargo, so that the vehicles and pieces of cargo can be securely held in place without the necessity of carpentry or the use of wood for chocking, shoring, or bracing. Since the sections of the flooring when laid are secured to one another and to the ship's sides, there is no likelihood of the flooring shifting as sometimes occurs with dunnage. In addition, the flooring can be used for separating different lots of cargo and, since the planks in a unit are all secured together, the weight of the flooring and the load thereon is distributed, so that there is less likelihood of damage to fragile cargo beneath the flooring than when dunnage is employed. If desired, the flooring can be used beneath general cargo in the lower hold or between-decks to raise the cargo and prevent water damage.

The hinge assemblies employed in the flooring are of simple construction and can be easily taken apart and assembled. A repair to the flooring involving removal and replacement of the damaged plank is, accordingly, a simple operation and it is also simple to install a shackle at any point on the flooring where one is not available.

I claim:

1. A stowable floor unit for use in a chamber for holding cargo, which comprises a plurality of planks arranged side by side in spaced relation, and a plurality of hinge assemblies securing each plank to an adjacent plank, each assembly comprising a frame strap enclosing a plank and having overlapping ends in the space between the plank and the one next to it, and means lying between the planks and between the planes of their upper and lower surfaces for connecting the straps of adjacent assemblies, the connecting means including a removable element acting as a hinge pin and connecting the overlapping ends of the strap of one assembly.

2. The floor unit of claim 1, in which one of the overlapping ends of each strap forms a sleeve and the ends have registering slots, a tongue engaging the inside of the strap has an end lying in the slots with an opening aligned with the opening through the sleeve, a connector of U-shape is interlinked with the strap on the adjacent plank and its legs lie at opposite ends of the sleeve and have openings aligned with the sleeve opening, and a hinge pin element passes through the openings in the legs of the connector, the sleeve, and the tongue.

3. The floor unit of claim 2, in which the tongue is of L-shape and has one end section lying against the inside of the inner of the overlapping ends of the strap.

4. The floor unit of claim 1, in which a shackle of U-shape is mounted on the hinge pin element with its ends outside the ends of the strap connected by the pin element.

5. The combination with a marine cargo vessel having a cargo hold, of a stowable cargo floor comprising a plurality of flooring units, each comprising a plurality of planks laid side by side in spaced relation, hinge assemblies connecting adjacent planks, each assembly including a strap enclosing a plank with the straps enclosing adjacent planks connected by means lying between the planks and between the planes of their upper and lower surfaces, the connecting means including a removable hinge pin securing together the ends of the strap enclosing one of the planks, means for connecting one end of each unit to the side of the vessel, a pair of cables lying beneath each unit and having their outer ends connected to the side of the vessel, and a ring connecting the inner ends of the cables and adapted to be connected to one of the vessel's falls.

6. The combination of claim 5, in which shackles are mounted on selected hinge pins.

References Cited in the file of this patent

UNITED STATES PATENTS

| | | |
|---|---|---|
| 254,630 | Farrar | Mar. 7, 1882 |
| 1,531,440 | Hoyt | Mar. 31, 1925 |
| 2,419,107 | Baldwin | Apr. 15, 1947 |

FOREIGN PATENTS

| | | |
|---|---|---|
| 28,313 | Great Britain | Dec. 24, 1907 |